Aug. 19, 1924.

C. W. LARNER 1,505,208

BRANCH OR Y-PIPE STRUCTURE

Filed Oct. 1, 1923

INVENTOR
Chester W. Larner
BY
Edwards, Sager & Bower
his ATTORNEYS

Aug. 19, 1924.

C. W. LARNER

1,505,208

BRANCH OR Y-PIPE STRUCTURE

Filed Oct. 1, 1923 7 Sheets-Sheet 2

INVENTOR
Chester W. Larner
BY
Edwards Sager & Bower
his ATTORNEYS

Aug. 19, 1924.

C. W. LARNER 1,505,208

BRANCH OR Y-PIPE STRUCTURE

Filed Oct. 1, 1923

INVENTOR
Chester W. Larner
BY
Edward Sager & Bower
his ATTORNEYS

C. W. LARNER 1,505,208

BRANCH OR Y-PIPE STRUCTURE

Filed Oct. 1, 1923   7 Sheets—Sheet 5

INVENTOR
Chester W. Larner
BY
Edwards, Sager & Bower
his ATTORNEYS

C. W. LARNER

1,505,208

BRANCH OR Y-PIPE STRUCTURE

Filed Oct. 1, 1923　　7 Sheets-Sheet 7

INVENTOR
Chester W. Larner
BY
Edwards, Sager & Bower
his ATTORNEYS

Patented Aug. 19, 1924.

1,505,208

UNITED STATES PATENT OFFICE.

CHESTER W. LARNER, OF PHILADELPHIA, PENNSYLVANIA.

BRANCH OR Y-PIPE STRUCTURE.

Application filed October 1, 1923. Serial No. 665,774.

*To all whom it may concern:*

Be it known that I, CHESTER W. LARNER, a citizen of the United States, residing at Philadelphia, in the county of Philadelphia and State of Pennsylvania, have invented certain new and useful Improvements in Branch or Y-Pipe Structures, of which the following is a specification.

The branching of large pipes or of pipes under high pressure into unequal branches or into a side outlet taken off the straight run of pipe, results in a tendency of the structure to deform when subjected to internal pressure, causing indeterminate local stresses and consequent danger of failure of the pipe in service.

The principal object of the present invention is to overcome these objections to prior constructions and provide a pipe branch embodied in—

(*a*) A structure devoid of tendency to deform.

(*b*) A structure the main members of which are in pure tension and in which no bending moments exist, thus insuring maximum economy of materials.

(*c*) A structure in which all of the principal stresses are readily and simply analyzed and computed, thus eliminating the element of guess work inherent in the usual types of construction.

(*d*) A structure in which may be utilized any or all of the various materials ordinarily employed in the construction of pipes under pressure, such as cast iron, cast steel, steel plate and reinforced concrete.

In the accompanying drawings illustrating the invention—

Figs. 21 and 22 are top or plan views of pipe structures embodying the invention and showing further modifications.

The invention, stated in general terms, consists of a bifurcated structure having the following principal characteristics;

(*a*) Branches or passages of different relative cross sectional area, the walls of which in cross-section, are arcs of circles, these arcs being of progressively changing radius to maintain a constant cross-sectional area or to increase or reduce the area as may be required.

(*b*) A junction between the walls of the branches along their intersection, making the walls of the entire structure continuous in a transverse direction and enabling the transverse tension in the wall of one passage to act upon and be absorbed by the corresponding tension in the wall of the other passage, leaving no residual forces in the entire structure excepting those acting along the common chords passing through the intersection of the walls.

(*c*) A tie member along the plane of the common chords to take up the residual forces above mentioned.

In the specific embodiment of the invention shown in Figs. 1 to 4 the main pipe 1 divides at 2—2 into two unequal branches 5 and 6. The axis of pipe 1 coincides with the axis of branch 5. The walls of branches 5 and 6 intersect along the line 7—8 and a partition 9 extends along this line 7—8 between 5 and 6 and acts as a tie member between the opposite upper and lower walls.

Figures 1, 2, 3, 4:
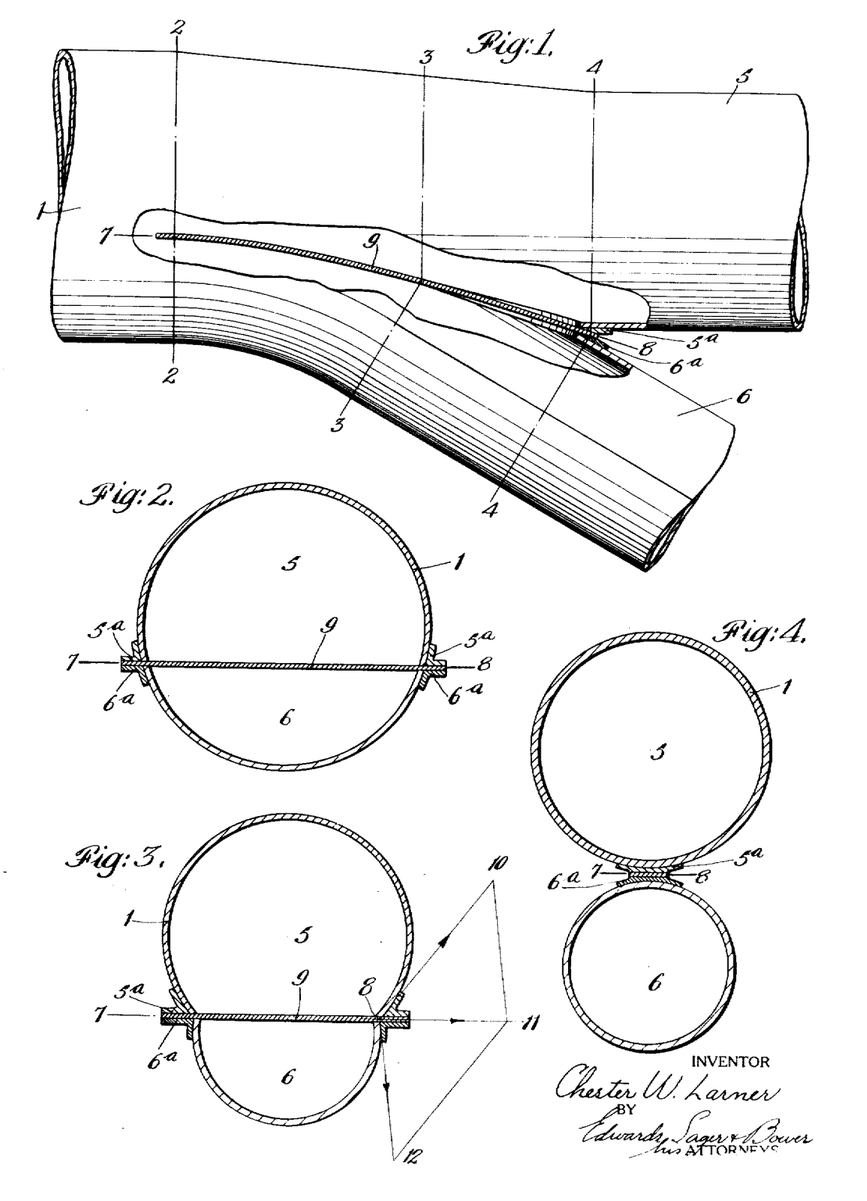
Fig. 1 is a top or plan view with parts broken away of a branch or Y-pipe structure embodying the invention.
Figs. 2, 3 and 4 are sectional views taken respectively on lines 2—2, 3—3 and 4—4 of Fig. 1.

Fig. 2 a cross-section of Fig. 1 is shown taken along 2—2 at the beginning of the branch. The walls are those of pipe 1 and the sum of the areas of branches 5 and 6, of course, is (neglecting the thickness of partition 9) the same as the area of main pipe 1. The position of partition 9 is selected so that the ratio of the area of branch 5 to that of branch 6 at this point is the same as at 4—4 where the passages have become circular. The areas of branches 5 and 6 are uniform so that this arrangement provides for uniform velocity of flow in conduits 1, 5 and 6. Uniform velocity is not necessary, however. The velocity may be retarded or accelerated if desired by correspondingly expanding or contracting the cross sectional area in the direction of flow.

Fig. 3 is a cross-section of Fig. 1 along 3—3 and Fig. 4 is a cross-section along 4—4. The successive areas of branch 5 in Figs. 2, 3 and 4 are equal and similarly the successive areas of branch 6 are equal in Figs. 2, 3 and 4, and the walls of conduits 5 and 6 are arcs of circles intersecting at 7—8. In passing from 2—2 to 4—4, the radii of the walls gradually merge from the radius of main 1 to the radii of the separate circular pipes 5 and 6 respectively.

Referring to Fig. 3, the parallelogram 8—10—11—12 represents graphically the forces developed at 8 by the internal pressure applied to the pipe. The tangent 8—10 represents to a certain scale the tension in the wall of branch 5 and the tangent 8—12 that in the wall of branch 6. The diagonal 8—11 is the resultant tension acting on the tie-member or partition 9 and it may be demonstrated mathematically that, provided the internal pressure is the same in branches 5 and 6, the resultant 8—11 always passes through the common chord of the walls of the two passages, no matter what the radii of the two walls may be. Thus the general proposition may be demonstrated that if such a structure has walls which are at all points arcs of circles in cross-section and a tie-member is provided in the plane of the common chords, all of the forces will be in equilibrium. There will be no bending moments and hence no tendency to deform and no stresses except pure tension.

The stress in the wall of branch 5 is proportional to component 8—10. The stress in the wall of branch 6 is proportional to component 8—12. The stress in partition 9 is proportional to resultant 8—11 and no other transverse stresses exist.

In the embodiment of the invention shown in Figs. 1 to 4 the pipe walls are attached to the tie member 9 by angle strips or filler pieces 5ª—6ª riveted or otherwise fastened to the pipe walls and tie member as shown.

Figures 5, 9:
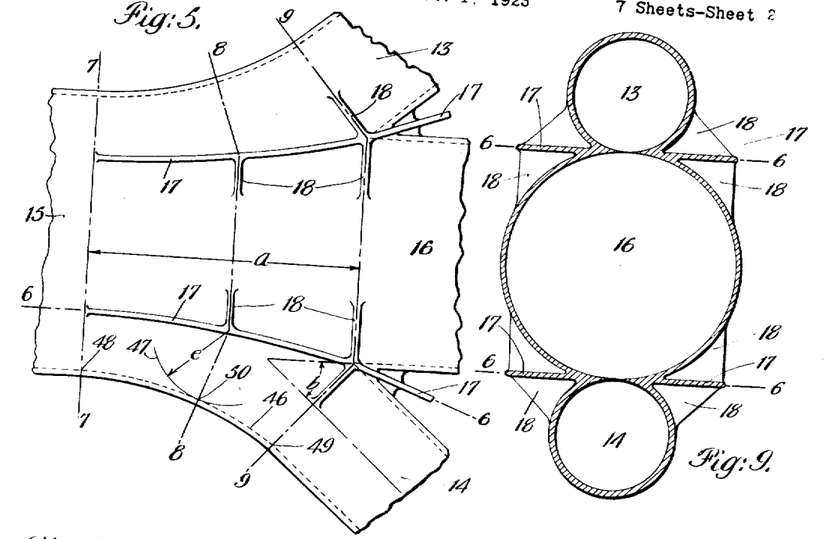
Fig. 5 is a top or plan view of a modification.
Figs. 6, 7, 8 and 9 are sectional views taken respectively on the lines 6—6, 7—7, 8—8 and 9—9 of Fig. 5.

In the modification shown in Fig. 5 there are two side-outlets 13 and 14 opposite each other on a straight run of pipe 15. The center outlet 16 is of such size that the sum of the areas of branches 13, 14 and 16 is equal to the area of pipe 15. As already explained, however, such a relation of areas is not essential to the working out of this method of construction. Any or all of the areas of branches 13, 14 and 16 may be increased or decreased as desired.

Fig. 5 also shows another form of the tie-member which may be substituted for the internal partition 9 of Fig. 1. This consists of an external rib 17 in the plane of the common chords and extending completely around the crotch formed by the intersecting branches, like the well known G frame of a punch or shear. This rib is proportioned to take care of the forces acting along the common chords. In some cases this construction may be preferable because it keeps the water passages clear and free from obstructions and avoids the eddies which would result if one of the branches were shut off, either entirely or partially.

On account of the rib being curved and necessarily rather deep, it is braced sideways by the ribs 18.

Figure 6:
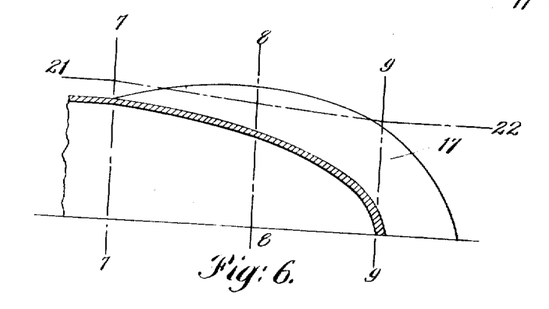

In Fig. 6 the section is taken along line 6—6 of Fig. 5 to show rib 17 in elevation. In this figure the line 21—22 is a profile of the inside of the wall of the passage 15—16 as seen in elevation.

This invention is of a general character and applicable to all unequal Y-branches and side outlets, regardless of the relative areas of the branches or the question of whether the velocity of flow is to be maintained constant, to be reduced or to be accelerated.

In order to lay out or design a branch-pipe in accordance with the principles of this invention, however, the designer will maintain the proper areas and at the same time secure the smooth contours so important from a hydraulic standpoint. In this connection, it is essential to keep in mind the elements of the design which must be adhered to and those which may be varied or manipulated to secure the desired results.

To illustrate the method of designing refer to Fig. 5 and assume that the branches 13 and 14 are each to be one-quarter the area of pipe 15 and branch 16 is to be one-half the area of pipe 15. It follows, of course, that the velocity through the structure is to be maintained uniform.

Figure 7:
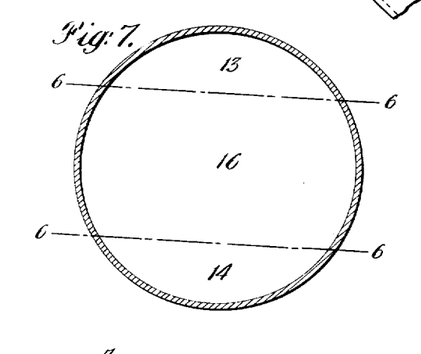

The position of the chords 6—6 in Fig. 7 is then fixed so that the areas of the segments 13 and 14 are each one-quarter of the area of the complete circle. This fixes the position of the line 6—6 where it intersects line 7—7 in Fig. 5.

The next step is to assume a length "a" for the outlet and an angle "b" between the axis of the outlet and the axis of the main pipe. The angle "b" may occasionally be fixed by the direction of the pipe leading away from the branch but usually some latitude will be permissible. The length "a"

is usually entirely dependent upon the judgment of the designer, although it is apparent that the greater the diameter of the outlet branch 13, the greater "a" must be. Keeping in mind the importance of long, easy curves, the designer will be able with a few trials to determine tentative values for "a" and "b", thus establishing the section 9—9 and the point at which line 6—6 crosses line 9—9.

The balance of the design consists now of determining the following variables:

(1.) The profile of the central passage 16 (line 21—22 in Fig. 6).

(2.) The shape of the curve 6—6.

(3.) The curve 46 of the passage 14 between sections 7—7 and 9—9.

Item (1) may usually be disposed of immediately by assuming that the profile is a straight line from 7—7 to 9—9. This is not necessarily the case, however, and sometimes it is of considerable assistance, in working out the sections between lines 7—7 and 9—9, to change the profile to a curve, and this may be done provided the curve is smooth and comes tangent to the horizontal portions of the profile to the left of line 7—7 and to the right of line 9—9.

Item (2) follows directly from the assumed profile 21—22. Only the design of section 8—8 of Fig. 5 will be considered since this is the only section intermediate between lines 7—7 and 9—9, but in an actual design several intermediate sections should be laid out in order to get an accurate design.

The cross-section on line 8—8 is laid out as follows, referring to Fig. 8:

The walls of passage 16 are struck with a radius "c" equal to the height of the vertical profile 21—22 at section 8—8 as viewed in Fig. 6. The common chords 6—6 are then located so that the area of central passage 16 of Fig. 8 equals the area 16 of Fig. 7. The location of line 6—6 in Fig. 8 determines the point on section 8—8 of Fig. 5 through which the line 6—6 passes and thus determines the curvature of line 6—6 in Fig. 5.

Figure 8:
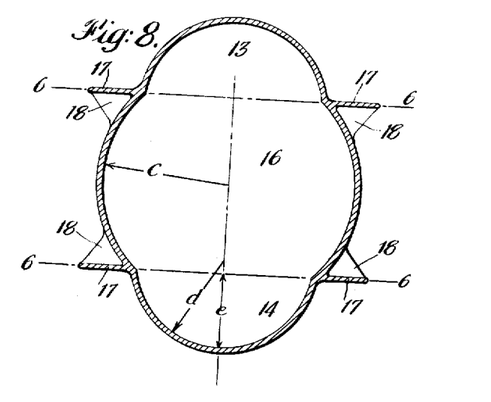

Reverting now to Fig. 8, the walls of passages 13 and 14 are next struck with a radius "d", so chosen that the arc shall intersect the arcs of radius "c" on the line 6—6 and at the same time, shall make the areas of branches 13 and 14 of Fig. 8 equal to areas 13 and 14 of Figs. 7 and 9. The distance "e" of Fig. 8 is now used as a radius to describe the arc 47 of Fig. 5 and a smooth curve is drawn through the points 48 and 49 and tangent to the arc 47. From the center of the arc 47 a line is drawn through the point 50 of tangency between the arc and the curve, thus completing section 8—8 as it appears in Fig. 5.

If it is found impossible to draw a smooth curve through points 48, 49 and 50 or if such curve is found to be too abrupt for good hydraulic flow, the design must be revised by modifying any or all of the dimensions "a", "b" and "c". "c" cannot be modified much and sometimes "b" cannot be changed much, if at all, but "a" can always be changed to almost any extent necessary and its effect upon the curve 48—50—49 is very marked.

After determining a point 50, at about the center of the curve 48—50—49, several more intermediate sections should be laid out to check this curve as drawn, and the curve modified if necessary to give accurate cross-sectional areas of the three passages 13, 14 and 16.

Figure 10:
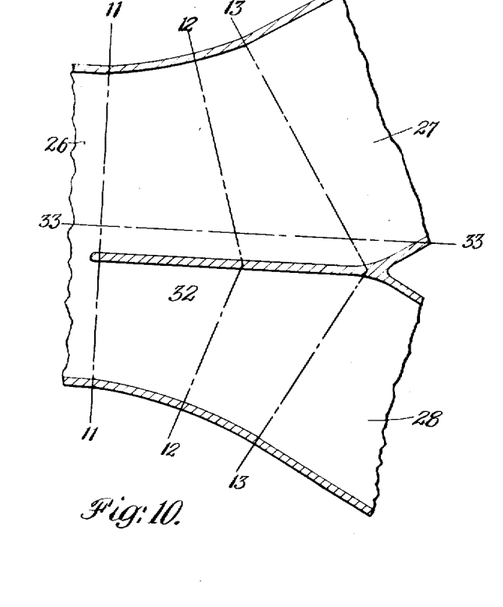
Fig. 10 is a horizontal sectional view of another modified form of branch connection.

In the modification shown in Fig. 10 the Y-branch is of the so-called unsymmetrical type in which both branches lead off at an angle with the axis of the main pipe, and the branches are of unequal area.

Figure 11:
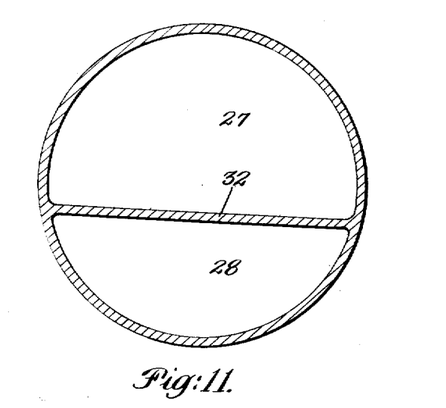
Figs. 11, 12 and 13 are sectional views taken respectively on lines 11—11, 12—12 and 13—13 of Fig. 10.
Figure 12:
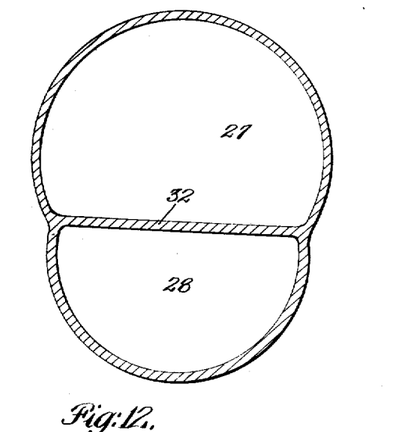
Figure 13:
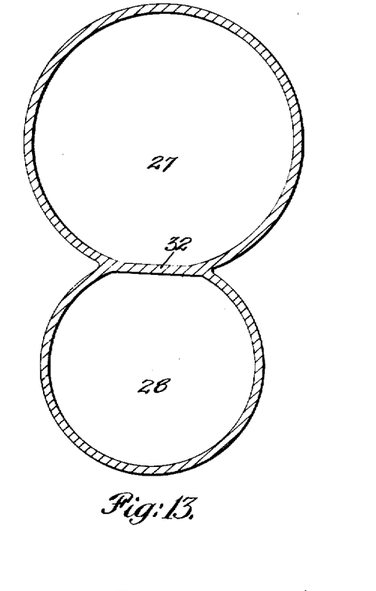

Pipe 26, whose axis is 33—33, branches at 11—11 (see Fig. 11) into two passages 27 and 28. Partition 32 is located so that the areas of branches 27 and 28 at 11—11 have the same ratio as at 13—13 (see Fig. 13) and the radii of the walls at 12—12 (see Fig. 12) are made such as to maintain the same ratio. The parts of the structure shown in Fig. 10 are proportioned not only to maintain a constant ratio of areas but to maintain constant areas. Either the areas or the ratio or both, however, may be varied at will.

Figure 14:
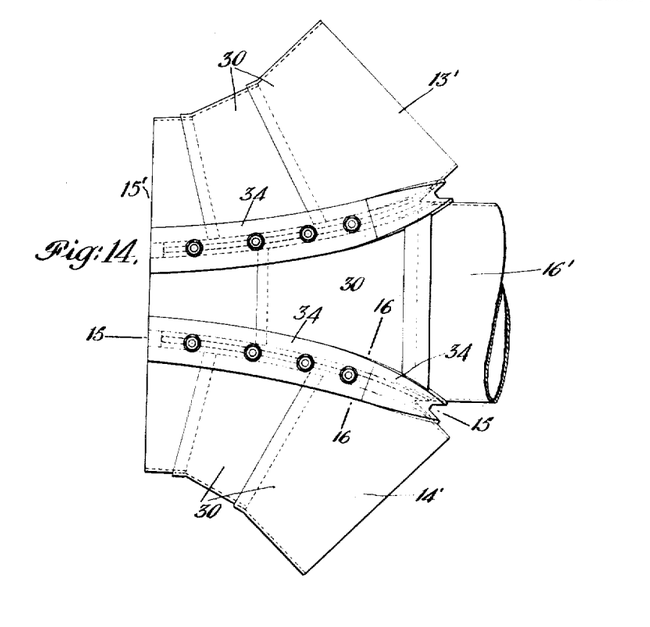
Fig. 14 is a top or plan view of a further modification.

Fig. 14 shows a pipe-branch similar to Fig. 5 except that the three outlets 13', 16' and 14' are of equal area. The sum of the areas of the outlets is equal to the area of the inlet 15' thus providing for uniform velocity of flow. This figure shows a method of constructing such a pipe-branch with walls of steel plate sections 30 fitting successively one within the other and riveted or otherwise fastened together. Each plate section is bent at its end to accurately fit around the section immediately preceding it. This construction is particularly applicable to large pipes where cast walls would be too expensive or difficult to ship. The contour of the branches and the cross-sectional areas are determined as if the structure were to be cast true to form and the plates are laid out to conform as closely as possible to the true curves and dimensions. Obviously, if the plate sections are rolled from flat plates without dishing or other forming the plate work will only approximate the true form, as shown.

Figure 15:
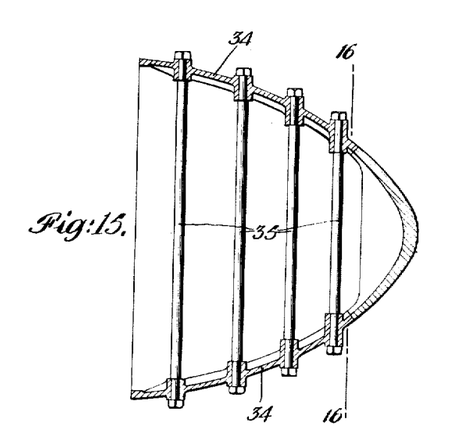
Fig. 15 is a cross section of Fig. 14 taken on line 15—15.
Figure 16:
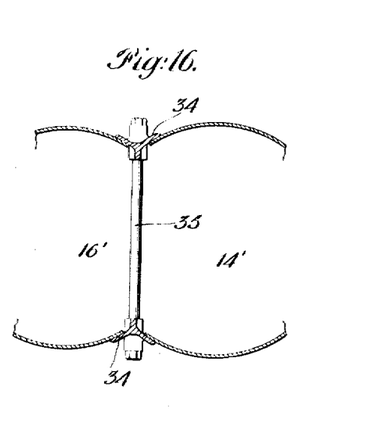
Fig. 16 is a cross sectional view of a detail of Fig. 14 taken on line 16—16.

The plate work of the three branches is connected by two cast-steel flanges 34, extending around the crotches at the intersections of the branches, and riveted to the plates. The flanges 34 are tied together internally by the bolts 35, shown in Fig. 15, which is a cross-section of Fig. 14 on the line 15—15. Fig. 16 is a typical cross-section of the flange 34 showing one of the bolts 35.

Where pipe-branches are built of steel plate it is obvious that the construction, so far as stresses are concerned, only approximates the ideal conditions which are realized when the walls and tie-member are cast in one piece, as in Figs. 5 and 10. Where the plates depart from the true form of the walls there will be some tendency to deform, depending upon the extent of the divergence. Also bending moments will exist at the lapped joints and at other points where the true theoretical shape cannot be maintained. By skillful designing, however, these local imperfections may be minimized and for all practical purposes it may be said that the main elements of the structure are subjected to tensile stresses only and have no tendency to deform when subjected to internal pressure.

The use of the bolts 35 has some advantages over the partition 9 of Fig. 1 in that the bolts provide an internal tie and at the same time permit the water to pursue the path of least resistance within the body of the structure. This is an important consideration if one or more of the branch outlets are closed, or partially closed.

Figure 17:
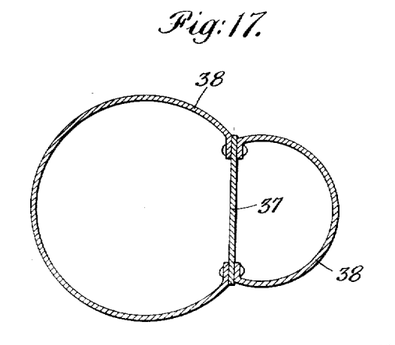
Figs. 17, 18 and 19 are sectional views of pipe structures embodying this invention and illustrating different forms of tie-members.

In Fig. 17, a diaphragm or partition 37, such as a steel plate, is combined with cast walls 38, flanged inward. In this design the flanges would have to be heavy enough to take care of the local bending moments in the flanges. This design is best suited for low pressures or small size pipes on account of the fact that the rivets are in tension.

Figure 18:
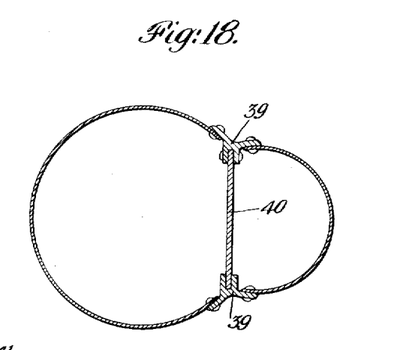

Fig. 18 shows a plate steel construction such as Fig. 14 with a diaphragm 40 substituted between the flange members 39 for the bolts 35 of Fig. 14.

Figure 19:
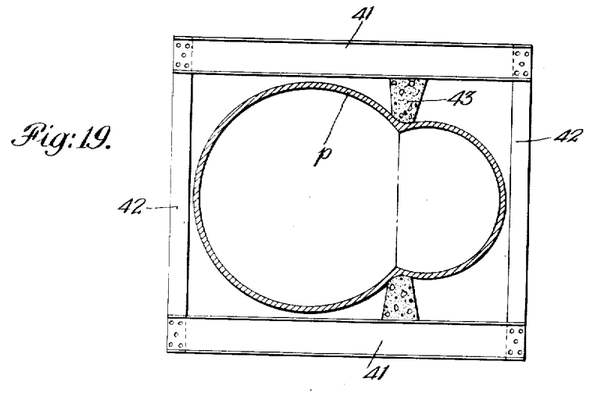

Fig. 19 shows an external tie-member used with a branch pipe $p$ cast in one peice. The tie-member consists of beams 41 connected together at their ends by the members 42 and concrete blocks 43 poured between the beams and the crotches where the branches of the pipe intersect. This arrangement takes up the forces along the common chords and at the same time keeps the water passages clear.

Figure 20:
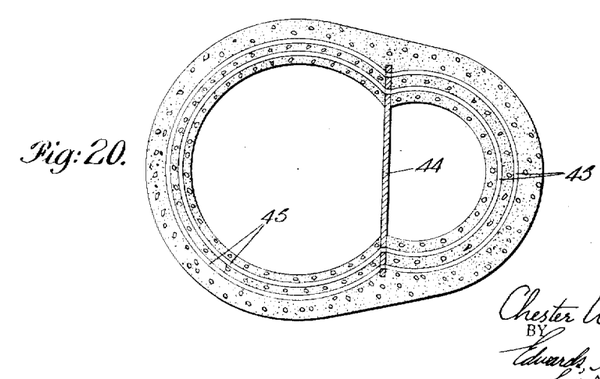
Fig. 20 is a sectional view of a branch structure formed of reinforced concrete.

Fig. 20 shows a method of constructing a pipe-branch of reinforced concrete. The tie-member 44 is a plate with holes punched in it, through which the reinforcing bars 45 are threaded. The bars 45 are proportioned to take the stresses in the walls of the passages.

The angle "$b$" between the branches may be made considerably greater than shown in Fig. 5 but it can seldom be made greater than 60 degrees or 70 degrees. With angle $b=90$ degrees, for example, it will be found that the width of the passage 14 at section 9—9 is greater than the diameter of branch 14 after it has become circular, and this is an impossibility if constant areas are to be maintained.

Figure 21:
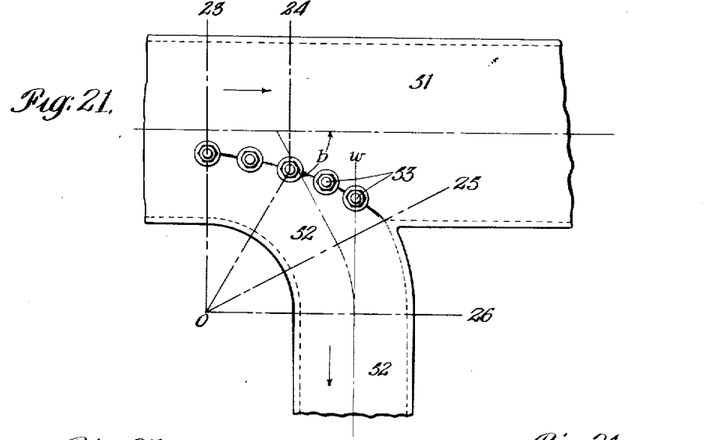
Figure 23:
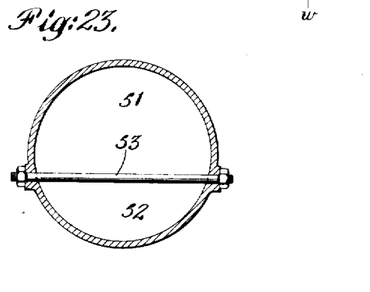
Figs. 23, 24, 25 and 26 are sectional views respectively on lines 0—23; 0—24; 0—25 and 0—26 of Fig. 21, and Figs. 27, 28 and 29 are sectional views respectively on lines 0—27; 0—28 and 0—29 of Fig. 22.
Figure 24:
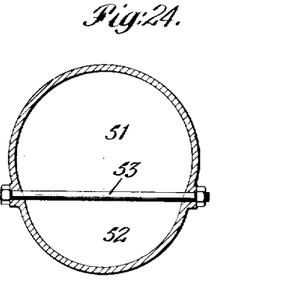
Figure 25:
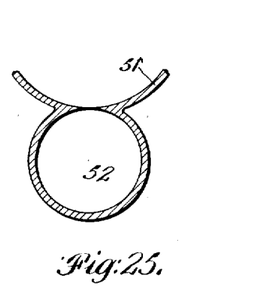
Figure 26:
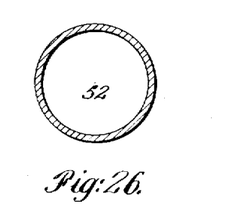

In order to take off a branch pipe at 90 degrees with the main pipe a construction similar to Fig. 21 is employed. This outlet is designed as far as section 0—25 as if the branch 52 were to continue at the angle "$b$" with the axis of the main pipe 51. The outlet is then carried on a radius from 0—25 to 0—26 where the axis of the outlet becomes perpendicular to the main pipe, so as to make a T connection. The successive sections of this pipe structure are shown in Figs. 23, 24, 25 and 26 taken respectively on the line 0—23, 0—24, 0—25 and 0—26 of Fig. 21. The flow conditions are good so long as the flow is in the direction of the arrows, and particularly if the bolts 53 are used as tie-members for the common chords. If the flow should be reversed in either pipe, however, the conditions would be bad due to the sharp bend at the right hand side of section 0—25.

The structure may be adapted for flow in either direction in either pipe as shown in Fig. 22 by making the structure symmetrical about the axis $x$—$x$ of the branch pipe. In Fig. 22 both halves of the branch pipe on each side of axis $x$—$x$ are made the same as the structure to the left of $w$—$w$ in Fig. 21. In this design all of the stresses are in equilibrium except at the crotch along $x$—$x$ from the bolt 56 to section 0—29 and bolts 59 are added to take care of the residual forces developed in this region. Successive sections of this pipe structure are shown in Figs. 27, 28 and 29 taken respectively along line 0—27, 0—28 and 0—29 of Fig. 22.

The construction of Fig. 22 provides a T connection, or 90 degrees side outlet, devoid of tendency to deform, with long easy bends and much superior, in respect to both structural strength and hydraulic efficiency, to the square corner or short radius T commonly used.

While the specific embodiments shown in the specification have a constant velocity of flow due to the maintenance of equal sectional areas at successive points the sectional areas of the pipes may be varied without departing from the principle of this invention. For instance in designing the structure of Fig. 5 to give an increase in sectional area of the branch 14 the center of the radius $d$ (see Fig. 8) would be shifted and the radius itself changed in length so as to give a circular arc intersecting the line 6—6 at the desired points and enclosing a segmental area corresponding to the desired increased sectional area for this branch 14. Similarly for each of the sections of this pipe the radius will be changed as to its center and length so as to give the desired increase in cross section while still preserving the arcuate form meeting the tie-chord 6—6 at the desired point.

To change the velocity of flow in the branch 16 the profile line 21 and 22 of Fig. 6 will be correspondingly changed thus causing a resultant shifting and re-shaping of the branch 16 as it appears in Figs. 5 to 9.

I claim:

1. A branch pipe construction comprising a bifurcated hollow body portion having end main and branch parts internally of unequal cross-section and fastened together at their meeting edges and having an internally arranged tie-means and being on each side of said means internally of progressively changing arcuate unequal cross-sections intersecting along the tie-means and merging into the unequal cross-sections of the main and branch parts, substantially as described.

2. A branch pipe structure in which the branch pipes are of unequal cross sectional areas and each of arcuate form in cross-section throughout their intersection and thereby devoid of tendency to deform by internal pressure and which is internally provided with a tie means common to both pipes and connecting the walls at the intersection thereof to retain the described form of each pipe.

3. A branch pipe structure in which the branch pipes are at their intersection of unequal cross sectional areas and fastened together at their meeting edges and each of a form devoid of tendency to deformation by internal pressure and which is provided with an internal tie common to the walls of the branch pipes and connected thereto at their intersection, substantially as described.

4. A branch or Y-pipe structure comprising the combination of a body having bifurcated or forked passages of unequal cross-sectional areas and bounded at one end by a circle and at the other end by tangent circles and at their intermediate portions by the arcs of circles cut off by common chords of progressively different lengths, and a tie means arranged substantially in the plane of the common chords.

5. A branch or Y-pipe structure comprising the combination of a body having a bifurcated or forked passage of which the cross-sectional area is different from the cross-sectional area of the other branch and bounded by arcs of circles cut off by common chords of progressively different lengths, and a tie means common to the branch pipes and arranged substantially in the plane of the chords.

6. A branch pipe construction comprising a bifurcated hollow body portion having end main and branch parts internally of unequal cross-section and having an internally arranged tie means and being on each side of said means internally of progressively changing arcuate unequal cross-sections intersecting along the tie means and merging into the unequal cross-sections of the main and branch parts, the cross-sectional areas of said main and branch parts being substantially constant throughout their intersection.

7. A branch pipe construction comprising a bifurcated hollow body portion having end main and branch parts internally of unequal cross-section and having an internally arranged tie means and being on each side of said means internally of progressively changing arcuate unequal cross-sections intersecting along the tie means and merging into the unequal cross-sections of the main and branch parts, the cross-sectional areas of said main and branch parts being substantially constant throughout their intersection and the sum of said areas being substantially equal to the cross-sectional area of said hollow body portion.

8. A branch pipe structure comprising a pipe having branches of unequal sectional areas leading from it, each branch beginning as a segment of a circle in a cross section normal to the lines of flow and changing in shape to fully circular in section at the point of separation of the branches, and tie means receiving the tension between the opposite walls along the intersection of said branches.

9. A branch pipe structure comprising a pipe having branches of unequal sectional areas leading from it, each branch beginning as a segment of a circle in a cross section normal to the lines of flow and changing in shape to fully circular in section at the point of séparation of the branches, and tie means receiving the tension between the opposite walls along the intersection of said branches, the successive cross sectional areas of each branch being substantially constant.

10. A branch pipe structure comprising a pipe having branches of unequal sectional areas leading from it, each branch beginning as a segment of a circle in a cross section normal to the lines of flow and changing in shape to fully circular in section at the point of separation of the branches, and tie means receiving the tension between the opposite walls along the intersection of said branches, the successive cross sectional areas of each branch being substantially constant and the sum of said areas being substantially equal to the cross sectional area of said pipe.

11. A branch pipe structure in which a branch is of cross sectional area different from the remainder of the branch structure and of progressively changing arcuate form in cross section throughout its intersection with said remainder which is also of arcuate form at said intersection, said intersection having means connecting said branch and said remainder together at their meeting edges, and means holding the opposite intersecting walls toward each other so that the entire structure is without tendency to deform under internal pressure.

12. A branch pipe structure in which a branch is of cross sectional area different from the remainder of the branch structure and of progressively changing arcuate form in cross section throughout its intersection with said remainder which is also of arcuate form at said intersection, said intersection having means connecting said branch and said remainder together at their meeting edges, and means holding the opposite intersecting walls toward each other so that the entire structure is without tendency to deform under internal pressure and tie means holding opposite portions of said connecting means from spreading so that the entire structure is without tendency to deform under internal pressure.

13. A branch pipe structure in which a branch is of cross sectional area different from the remainder of the branch structure and of progressively changing arcuate form in cross section throughout its intersection with said remainder which is also of arcuate form at said intersection, said intersection having means connecting said branch and said remainder together at their meeting edges and also having tie means connecting the opposite walls, so that the entire structure is without tendency to deform under internal pressure.

14. A branch pipe structure in which a branch is of constant cross sectional area different from the remainder of the branch structure and of progressively changing arcuate form in cross section throughout its intersection with said remainder which is also of progressively changing arcuate form at said intersection, said intersection having means connecting said branch and said remainder together at their meeting edges and also having tie means connecting the opposite walls, so that the entire structure is without tendency to deform under internal pressure.

CHESTER W. LARNER.

Certificate of Correction.

It is hereby certified that in Letters Patent No. 1,505,208, granted August 19, 1924, upon the application of Chester W. Larner, of Philadelphia, Pennsylvania, for an improvement in "Branch or Y-Pipe Structures," errors appear in the printed specification requiring correction as follows: Page 5, line 17, claim 1, after the compound word "cross-section" strike out the words "and fastened together at their meeting edges," and insert the same to follow the word "section," line 28, claim 2; and that the said Letters Patent should be read with this correction therein that the same may conform to the record of the case in the Patent Office.

Signed and sealed this 14th day of October, A. D. 1924.

[SEAL.]

KARL FENNING,
*Acting Commissioner of Patents.*